United States Patent
Foo et al.

(10) Patent No.: US 8,103,118 B2
(45) Date of Patent: Jan. 24, 2012

(54) ELECTRONIC DEVICE WITH OPTOELECTRONIC INPUT/OUTPUT COMPENSATION FUNCTION FOR A DISPLAY

(75) Inventors: Ken K. Foo, Gurnee, IL (US); Zhiming (Jim) Zhuang, Buffalo Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1816 days.

(21) Appl. No.: 11/018,264

(22) Filed: Dec. 21, 2004

(65) Prior Publication Data

US 2006/0132424 A1    Jun. 22, 2006

(51) Int. Cl.
*G06K 9/40* (2006.01)
*G09G 3/36* (2006.01)
*G09G 5/10* (2006.01)
*G09G 5/00* (2006.01)
*G06F 3/038* (2006.01)

(52) U.S. Cl. .......... 382/274; 345/90; 345/690; 345/102; 345/63; 345/207; 250/205

(58) Field of Classification Search .......... 345/90, 345/690, 102, 63, 207; 250/205; 382/274
See application file for complete search history.

(56) References Cited

U.S. PATENT DOCUMENTS

| | | | | |
|---|---|---|---|---|
| 4,774,401 | A | * | 9/1988 | Yamada et al. ............ 250/201.2 |
| 5,712,930 | A | | 1/1998 | Watanabe |
| 6,411,306 | B1 | * | 6/2002 | Miller et al. .................. 345/690 |
| 6,600,470 | B1 | * | 7/2003 | Tsuda ............................ 345/89 |
| 2002/0149598 | A1 | * | 10/2002 | Greier et al. .................. 345/589 |
| 2003/0184695 | A1 | | 10/2003 | Chen et al. |

FOREIGN PATENT DOCUMENTS

EP    1 111 578 A1    6/2001

OTHER PUBLICATIONS

Minseok Song; S6D0114 Preliminary 132 RGB X 176 DOT 1-Chip Driver IC With Internal Gram for 262,144 Colors TFT-LCD; Jul. 3, 2002 Ver. 0.0; pp. 1-5, 62, and 107-119.

* cited by examiner

*Primary Examiner* — John Strege
(74) *Attorney, Agent, or Firm* — Sylvia Chen; Philip A. Premysler

(57) ABSTRACT

Portable devices (100) that include displays (102) and are used in widely ranging ambient light conditions use selectable or adjustable optoelectronic input/output compensation functions to drive their displays. According to certain embodiments, a camera (122) or a light sensor (120) is used to measure the ambient light level, and an optoelectronic input/output compensation function that is specifically chosen based on the measured ambient light condition is used to drive the display. Furthermore, according to certain embodiments, the optoelectronic input/output compensation function is selected based on whether a display backlight (230) is turned on or off.

9 Claims, 12 Drawing Sheets

ELECTRONIC DEVICE WITH OPTOELECTRONIC INPUT/OUTPUT COMPENSATION FUNCTION FOR A DISPLAY

FIELD OF THE INVENTION

The present invention relates in general to information displays. More particularly, the present invention relates to displays for portable devices that are used under wide-ranging lighting conditions.

BACKGROUND OF THE INVENTION

Increases in the extent of integration of electronics has facilitated the introduction of a range of handheld devices including handheld cellular telephones, Personal Digital Assistants (PDA), laptop computers, portable Digital Versatile Disc (DVD) players, and handheld game consoles to name of few. Such devices are typically equipped with color Liquid Crystal Displays (LCD). The quality of the images presented on the displays plays an important role in determining the quality of the user experience in using such devices. Given that the devices are portable, they can be used under wide-ranging lighting conditions. The ambient light present when using such devices may be diffuse or more direct, vary in color and vary widely in intensity. Furthermore, the sensitivity and response of people's eyes is a function of the ambient light. The foregoing factors lead to displays working best under certain lighting conditions, and not as well under other lighting conditions. It would be desirable to mitigate the effect of ambient lighting variation on effective display quality.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
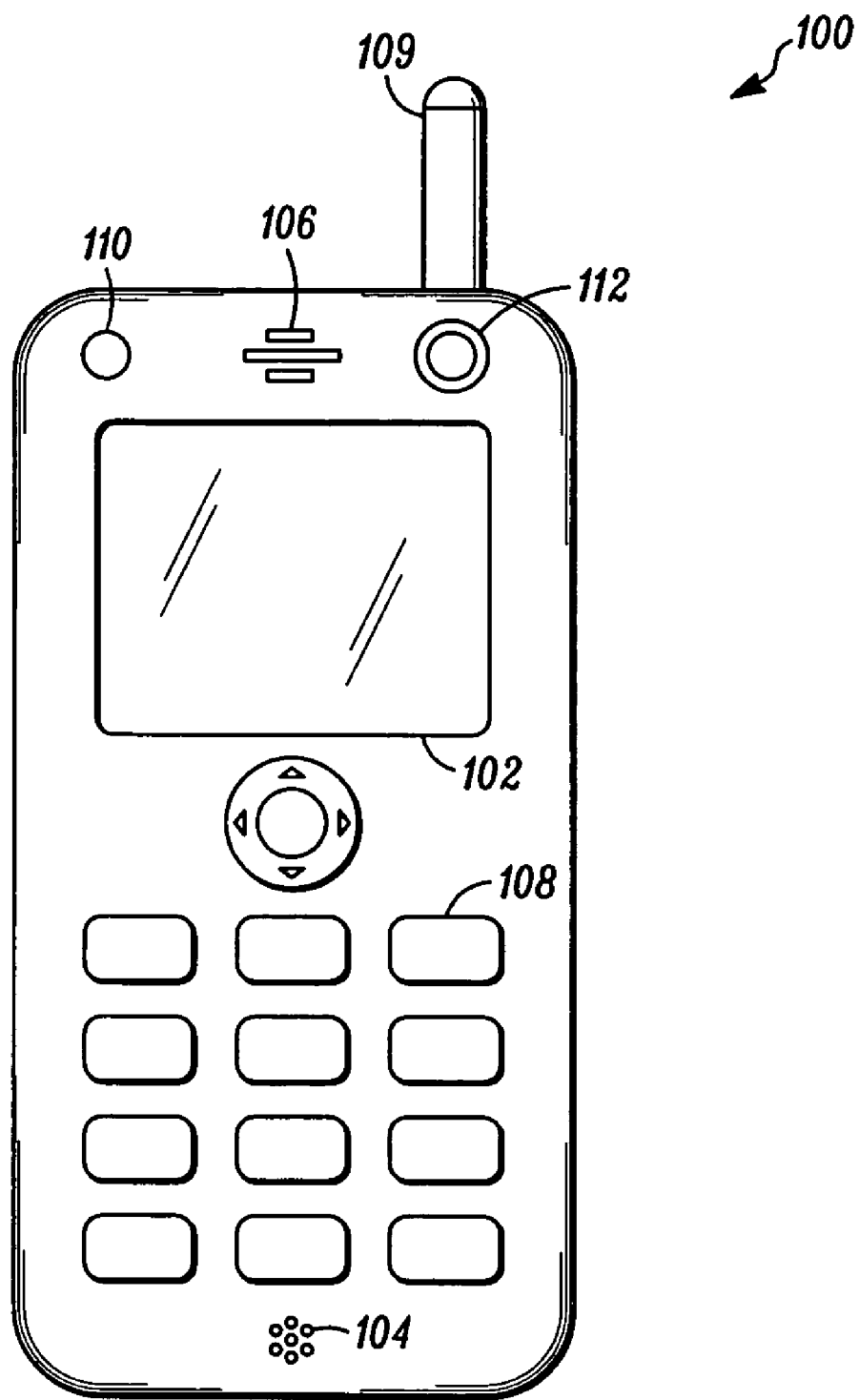
FIG. 1 is a front view of a portable electronic device with a transflective display according to a first embodiment.

FIG. 1 is a front view of a portable electronic device 100 with a transflective display 102 according to a first embodiment. As shown, the portable electronic device 100 comprises a wireless communication device in particular a cellular telephone, however alternatively the portable electronic device 100 is another type of device, for example, a PDA, laptop computer, portable DVD player or a handheld game console. Such devices are used under varying ambient light conditions. Alternatively, teachings described herein below are applied to non-portable devices such as, for example, LCD televisions.

As shown in FIG. 1, the device 100 further comprises a microphone 104, an earpiece speaker 106, a keypad 108, an antenna 109, a dedicated light sensor 110, and a camera 112. According to an alternative embodiment the light sensor 110 is eliminated and the camera 112 serves as a light sensor. The camera 112 can be effectively used as a light sensor by turning off an Automatic Gain Control (AGC) function and averaging light intensity measured by one or more pixels of the camera. Using a color camera, it is possible to detect light intensity in three color channels. An alternative approach to measuring light intensity with the camera 112 is to read a gain setting in an AGC circuit of the camera.

Figure 2:
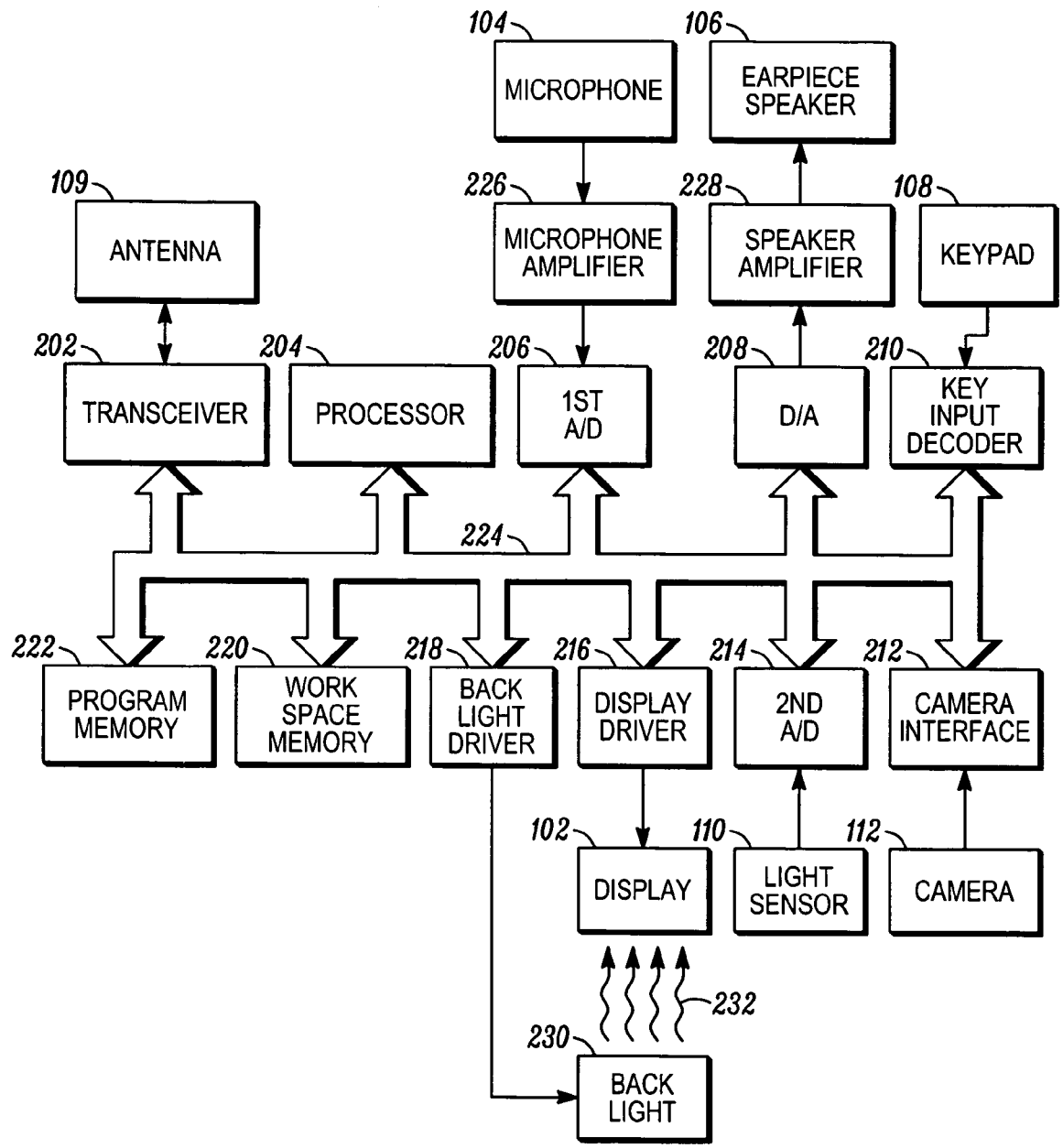
FIG. 2 is a block diagram of the portable electronic device shown in FIG. 1 according to the first embodiment.

FIG. 2 is a block diagram of the portable electronic device 100 shown in FIG. 1 according to the first embodiment. As shown in FIG. 2, the device 100 comprises a transceiver 202, a processor 204, a first analog-to-digital converter (A/D) 206, a digital-to-analog converter (D/A) 208, a key input decoder 210, a camera interface 212, a second A/D 214, a display driver 216, a backlight driver 218, a work space memory 220, and a program memory 222 coupled together through a system bus 224.

The transceiver 202 is coupled to the antenna 109. Microwave or RF signals modulated with information pass between the transceiver 202 and the antenna 109.

The processor 204 uses the workspace memory 220 to execute control programs for the device 100 that are stored in the program memory 222. Control programs for the device 100 are described below in more detail.

The microphone 104 is coupled through a microphone amplifier 226 to the first A/D 206. Spoken utterances are digitized by the first A/D 206 and made available to the processor 204 (or a specialized processor, not shown) for audio encoding or voice recognition.

The D/A 208 is coupled through a speaker amplifier 228 to the earpiece speaker 106. Digitally encoded audio, e.g. spoken words, are converted to analog form by the D/A 208 and output through the speaker 106.

The key input decoder 210 is coupled to the keypad 108. The key input decoder 210 identifies depressed keys to the processor 204. The camera interface 212 is coupled to the camera 112. The camera interface 212 receives raw pixel data from the camera 112 and outputs processed, digitized image information. The camera interface 212 alternatively also outputs the AGC setting of the camera which may be supplied to the processor 204 through an additional A/D (not shown).

The light sensor 110 is coupled to the second A/D 214 which digitizes light sensor signals output by the light sensor 110 and makes digitized representations of the light sensor signals available to the processor 204.

The backlight driver 218 is coupled to a backlight 230. The backlight 230 is also optically coupled to the display 102 by light 232 passing through a transparent coupler (not shown) or empty space.

The display driver 216 is coupled to the display 102. As described below in more detail, the display driver 216 is suitably of a type that allows optoelectronic input/output compensation functions to be varied. The optoelectronic input/output compensation function compensates for an optoelectronic input/output function that is inherent in the display 102.

Figure 3:
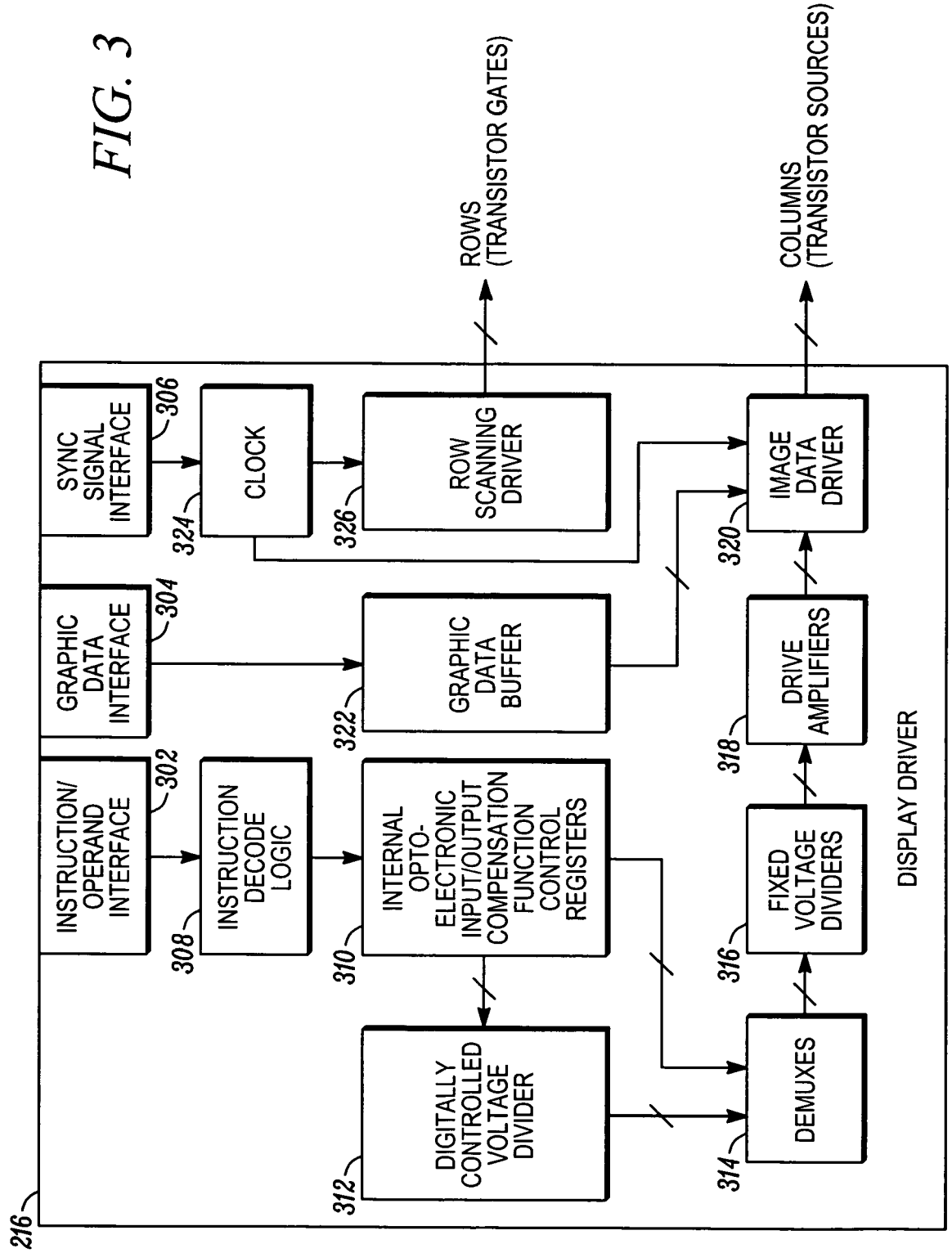
FIG. 3 is an exemplary block diagram of a display driver of the portable electronic device shown in FIG. 1 according to the first embodiment.

FIG. 3 is an exemplary block diagram of the display driver 216 of the portable electronic device 100 shown in FIG. 1 according to the first embodiment. The display driver 216 comprises an instruction/operand interface 302, a graphic (pixel) data interface 304, and a synchronization signals interface 306 which are coupled to the system bus 224. Commands and operands of commands that configure the display driver 216 are received through the instruction/operand interface 302. The instruction/operand interface 302 is coupled through instruction decoding logic 308 to one or more internal optoelectronic input/output compensation function control registers 310. The instruction decode logic 308 allows binary codes that determine characteristics of an optoelectronic input/output relation to be loaded into the control registers 310. As described below in more detail, an optoelectronic input/output compensation function that is implemented in hardware in the display driver 216 determines the input/output relation between input binary numbers that specify pixel intensity, and voltages applied to control pixel intensity, which in turn control pixel intensity itself.

The control registers 310 are coupled to a digitally controlled voltage divider 312 and to one or more demultiplexers 314 each of which is used to select one of plural taps of the digitally controlled voltage divider 312. The digitally controlled voltage divider 312 is controlled based on the contents of one or more of the control registers 310. Selection of taps by the one or more demultiplexers 314 is also controlled based on the contents of one or more of the control registers 310. At least two voltages are coupled from the demultiplexers 314 and/or directly from the voltage divider 312 to one or more fixed voltage dividers 316. Each of the demultiplexers 314 suitably includes several inputs that are coupled to different taps of the digitally controlled voltage divider 312. Each demultiplexer 314 selects and outputs one voltage. The output of each of the demultiplexers 314 represents one function value of the optoelectronic input/output compensation function. The one or more fixed voltage dividers 316 interpolate between the voltages output by the demultiplexers 314, and the fixed voltage dividers 316 output one or more additional voltages with values between each of several pairs of voltages output by the demultiplexers 314. The additional voltages are additional function values of the optoelectronic input/output compensation function. The additional voltages derived by fixed voltage dividers 316, and the several voltages selected by the demultiplexers 314 that are suitably passed through the fixed voltage dividers 316, are coupled to a plurality of drive amplifiers 318, which are able to source or sink sufficient current to drive the display 102. The drive amplifiers 318 are coupled to an image data driver 320. The image data driver 320 suitably has an output for each column of the display 102 and is used to drive the voltage applied to pixels of the display 102 based on pixel data.

The graphic data interface 304 is coupled to a graphic data buffer 322 that, in turn, is coupled to the image data driver 320. Binary pixel data for graphics (e.g., Graphical User Interface (GUI) elements, images, or video, for example) are loaded into the graphic data buffer 322 through the graphic data interface 304. The image data driver 320 selects one of the voltage levels output by the drive amplifiers 318 for each pixel in the display 102 based on binary pixel data in the graphic data buffer 322. For example if a 6-bit word is used to encode pixel brightness for each pixel, the image data driver 320 will select one of $2^6=64$ voltage levels output by the drive amplifiers 318 to drive each pixel of the display 102. The voltage of each of the 64 voltage levels will have been determined by the contents of the control registers 310, as previously described.

Optionally, a Direct Memory Access Manager (DMA) not shown in FIG. 2 is coupled to the graphic data interface and the workspace memory 220 and program memory 222 to allow fast transfer of graphic data.

The sync signal interface 306 is coupled to an internal clock 324 of the display driver 216. The internal clock 324 is coupled to the image data driver 320 and a row scanning driver 326. The row scanning driver 326 suitably includes an output for each row of the display 102, and selects one row of the display 102 at a time. When a row is selected by the row scanning driver 236, voltages output by the image data driver 320 will be applied to pixels in the selected row. Clock signals coupled to the row scanning driver 326 and the image data driver 320 are used to coordinate the timing of selection of rows by the row scanning driver 326 and outputting of data for selected rows by the image data driver 320.

Note that the segregation of the circuits of the display driver 216 into the blocks that are shown in FIG. 3 is not unique but was chosen in the interest of pedagogical clarity to highlight relevant aspects. Moreover, the architecture of the display driver 216 can be varied considerably from what is shown without departing from the spirit and scope of the teachings described herein.

According to an alternative embodiment the optoelectronic input/output compensation function is adjusted separately for each separate color of the display 102. For example, if the display 102 comprises red, blue, and green pixels, three sets of voltage levels are suitably provided. Each set includes a voltage level for each value of binary pixel data. To accomplish this in a display driver similar to that shown in FIG. 3, three digitally controlled voltage dividers 312, three sets of demultiplexers 314, three sets of fixed voltage dividers 316, and three sets of drive amplifiers 318 can be provided. Alternatively, one adjustable optoelectronic input/output compensation function can be used for one color channel, e.g., the green color channel to which the eye is most sensitive, and another adjustable optoelectronic input/output compensation function can be used for the other two color channels.

Figure 4:
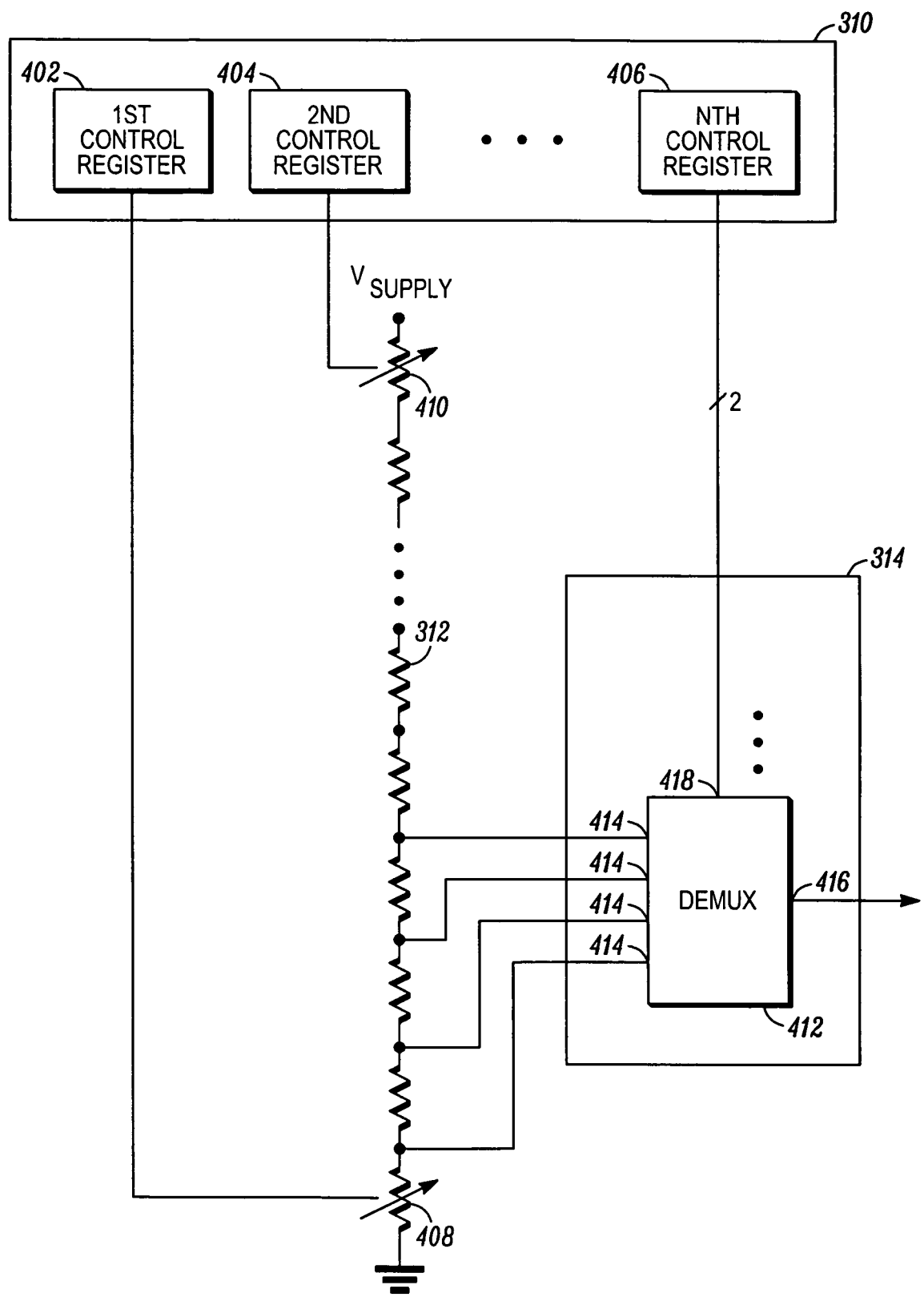
FIG. 4 is a more detailed schematic of a portion of the block diagram of the display driver shown in FIG. 3.

FIG. 4 is a more detailed schematic of a portion of the block diagram of the display driver 216 shown in FIG. 3. As shown in FIG. 4 there are a number N of internal optoelectronic input/output compensation function adjustment control registers 310 including a first control register 402, a second control register 404, and an nth control register 406. (Only three control registers 402, 404, 406 are shown in the interest of clarity.) As shown in FIG. 4, the digitally controlled voltage divider 312 includes a series network of resistors. The first control register 402 is coupled to a first variable resistor (or variable resistance network) 408. The resistance of the first variable resistor 408 is determined by the contents of the first control register 402. The first variable resistor 408 is used to establish a baseline reference voltage for voltages output by the digitally controlled voltage divider 312. The second control register 404 is coupled to a second variable resistor (or variable resistance network) 410. The contents of the second control register 404 determine the resistance of the second variable resistor 410. The second variable resistor 410 is used to scale the voltages output by the digitally controlled voltage divider 312. Although only two variable resistors 408, 410 are shown, in practice additional variable resistors can be included.

In FIG. 4, one demultiplexer 412 of the demultiplexers 314 is shown. (Additional demultiplexers not shown in FIG. 4 are suitably connected in like fashion.) The one demultiplexer 412 includes four inputs 414 (in practice more can be provided) that are connected to a sequence of junctions between successive resistors in the digitally controlled voltage divider 312. The one demultiplexer 412 will select one of the four inputs 414 to couple to an output 416 of the one demultiplexer 412. Which input 414 is selected is determined by the contents of the Nth control register 406, which is coupled to select control inputs 418 of the one demultiplexer 412. The voltage selected by the one demultiplexer 412 is one of the aforementioned several voltages output by the demultiplexers 314. Other voltages are output by similarly connected demultiplexers 314 not shown in FIG. 4. Thus, as described above, it is possible to control the voltage levels of the several voltages of the optoelectronic input/output compensation function in various ways using the control registers 310, the digitally controlled voltage divider 312 and the demultiplexers 314.

Figure 5:
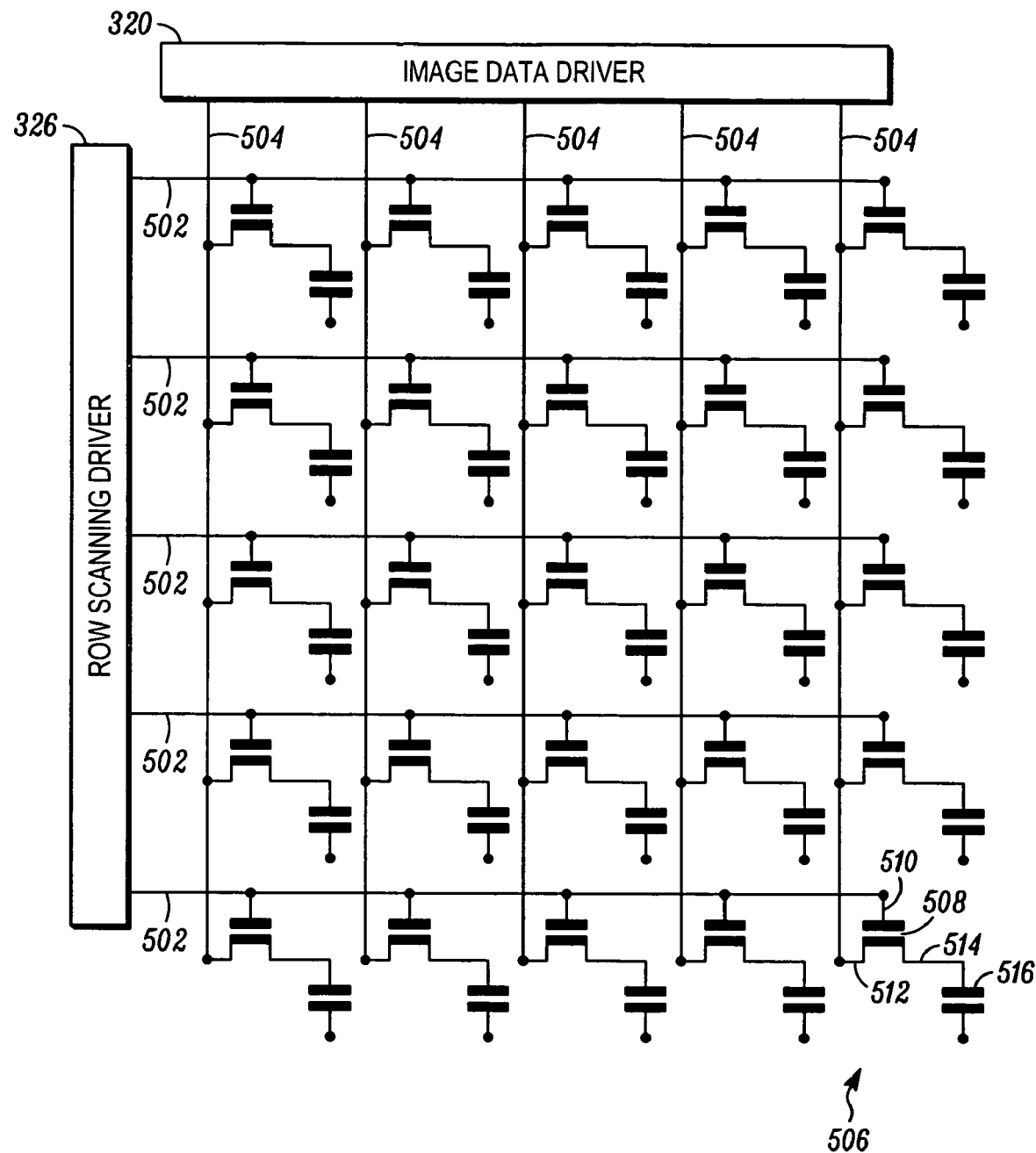
FIG. 5 is an electrical schematic of the transflective display of the portable electronic device shown in FIG. 1 according to the first embodiment.

FIG. 5 is an electrical schematic of the display 102 of the portable electronic device 100 shown in FIG. 1 according to the first embodiment. While FIG. 5 shows a schematic for a display of only 5 rows and 5 columns for a total of 25 pixels for purposes of illustration, in practice displays according to the embodiments described herein typically comprises hundreds of rows and hundreds of columns, for example 220 rows and 528 columns. As shown in FIG. 5, the display 102 comprises five row lines 502 which are coupled to outputs of the row scanning driver 326, and five column lines 504 which are connected to outputs of the image data driver 320. In as much as the circuits for the pixels of the display 102 are the same, the circuit of only one exemplary pixel 506 at the lower right hand corner of FIG. 5 will be described. The pixel 506 comprises a transistor 508. A gate 510 of the transistor 508 is coupled to a row line 502 and a source 512 of the transistor 508 is coupled to a column line 504. A drain 514 of the transistor 508 is coupled to a pixel electrode 516. When a prescribed voltage is applied to the row line 502 that is coupled to the exemplary pixel 506, the transistor 508 will be turned on. Concurrently, the column line 504 that is coupled to the exemplary pixel 506 will be driven to a voltage that is selected from the voltages output by the drive amplifiers 318. The selection is based on the pixel data for the exemplary pixel 506 that is stored in the graphic data buffer 322. The exact value of the voltage that is applied for a certain value of binary pixel data is dependent on the optoelectronic input/output compensation function that has been established using the digitally controlled voltage divider 312, the demultiplexers 314 and the fixed voltage dividers 316. When the optoelectronic input/output compensation function is changed, the voltages applied to pixel electrodes (e.g., 516) of the display 102 for each value of binary pixel data will also change.

Figure 6:
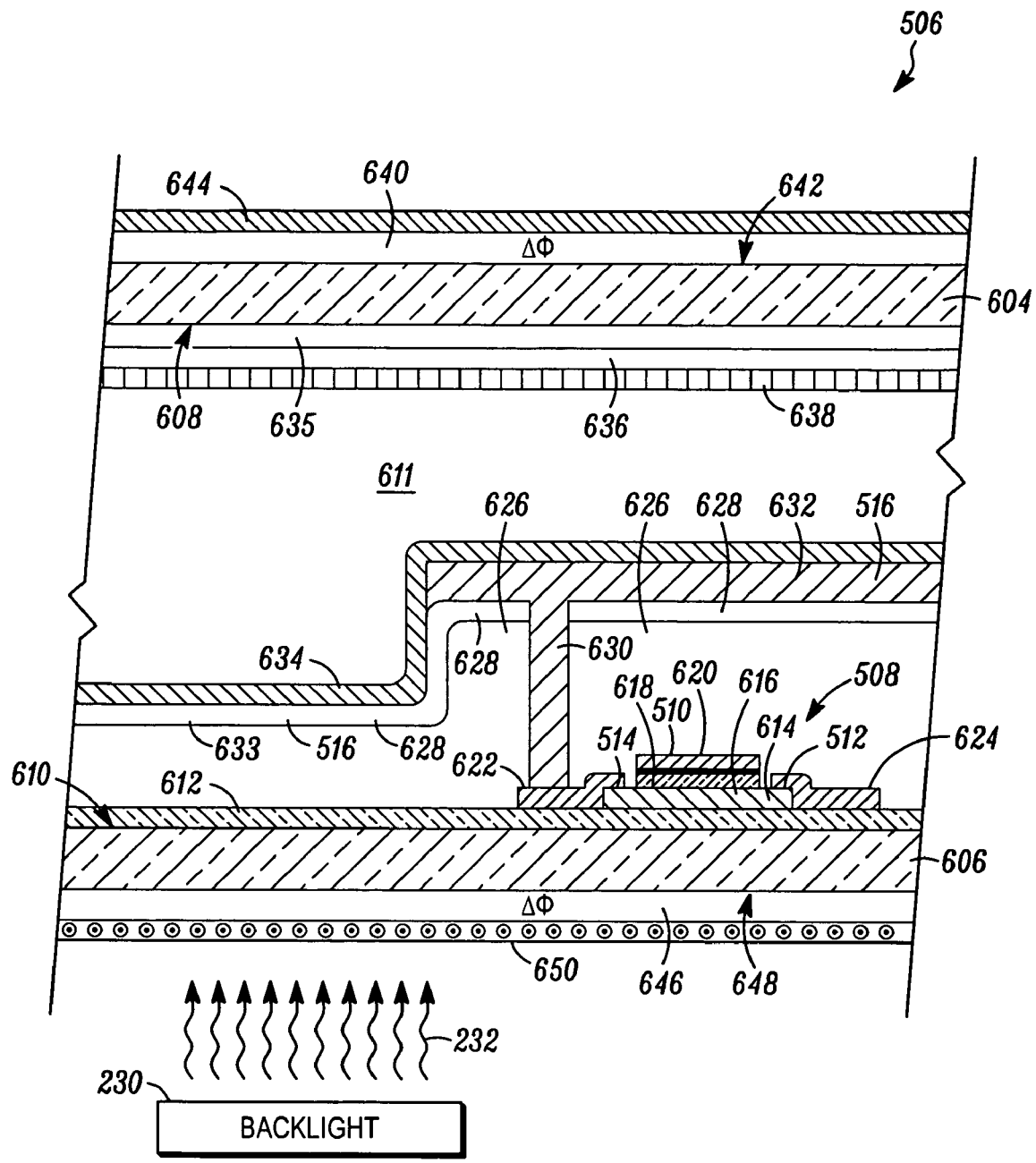
FIG. 6 is a fragmentary sectional view of an exemplary pixel of the transflective display of the portable electronic device shown in FIG. 1 according to the first embodiment.

FIG. 6 is a fragmentary sectional view of the exemplary pixel 506 of the display 102 of the portable electronic device 100 shown in FIG. 1 according to the first embodiment. As shown in FIG. 6, the display 102 comprises an upper transparent substrate 604 and a lower transparent substrate 606. An inner surface 608 of the upper transparent substrate 604 faces an inner surface 610 of the lower transparent substrate 606. A liquid crystal layer 611 is located between the upper transparent substrate 604 and the lower transparent substrate 606.

A passivation film 612 is disposed on the inner surface 610 of the lower transparent substrate 606. The transistor 508 is formed on the passivation film 612. The transistor 508 has a patch of semiconductor material 614, which includes the source 512, the drain 514, and a channel 616. A dielectric material 618 is disposed between the channel 616 and a gate electrode 620. The gate electrode 620 is coupled to one of the row lines 502 which extend perpendicular to the plane of the drawing sheet. A drain electrode 622 is in contact with the drain 514 and a source electrode 624 is in contact with the source 512. The source electrode 624 is connected to one of the column lines 504 which extends left to right but is located out of the plane of the drawing sheet. An insulating material 626 is located on the passivation film 612 and above the transistor 508. The insulating material 626 may comprise plural separately deposited layers and serves to isolate a wiring layer that includes the row lines 502 from a wiring layer that includes the column lines 504.

The height of the insulating material 626 is greater on the right side of the exemplary pixel 506 compared to the left side of the exemplary pixel 506 so that the space available between the upper transparent substrate 604 and the lower transparent substrate 606 for the liquid crystal layer 611 has two different thicknesses. Having dual thicknesses is intentional in this embodiment as will be explained further below.

A patch of transparent conductive material 628 is coated over the insulating material 626. A via filled with a conductive plug 630 extends from the drain electrode 622 up through the insulating layer 626 and the transparent conductive material 628 to a reflective electrode 632 that is located on the transparent conductive material 628 on the right side of the pixel 506. The portion of the transparent conductive material 628 on the left side of the pixel 506 that is not covered by the reflective electrode 632 serves as a transmissive electrode 633. The reflective electrode 632 and the transmissive electrode 633 are in electrical contact such that they both receive the same voltage signals. The pixel electrode 516 shown schematically in FIG. 5 includes the transmissive electrode 633 and the reflective electrode 632. The transmissive electrode 633 is used in spatially modulating light coming from the backlight 230 in order to present an image. The reflective electrode 632 of the exemplary pixel 506 is used in spatially modulating ambient light in order to present an image. A first liquid crystal alignment layer 634 covers the reflective electrode 632 and the transmissive electrode 633.

A color filter layer 635 is disposed on the inner surface 608 of the upper transparent substrate 604. The color filter layer 635 suitably includes a periodic tiling of color filters for three or more colors, one for each pixel of the display 102. A layer of transparent conductive material 636 is coated on the color filter layer 635. The layer of transparent conductive material 636 serves as a ground plane. In operation voltages applied through the transistor 508 to the pixel electrode 516 establish electric fields that extend from the pixel electrode 516 (reflective electrode 632 and transmissive electrode 633) across the liquid crystal layer 611 to the layer of transparent conductive material 636. A second liquid crystal alignment layer 638 covers the layer of transparent conductive material 636. The first liquid crystal alignment layer 634 and the second liquid crystal alignment layer 638 foster a helical phase of the liquid crystal layer 611 that exhibits birefringence. The birefringence exhibited by the liquid crystal layer 611 is modulated by application of the aforementioned electric fields. Alternatively, a liquid crystal with a chiral additive or an inherently chiral liquid crystal that inherently tends to assume a helical phase is used. Also alternatively, one or both of the liquid crystal alignment layers 634, 638 is dispensed with.

A first birefringent layer 640 is disposed on an outer surface 642 of the upper transparent substrate 604. A first polarizer 644 is disposed on the first birefringent layer 640. A second birefringent layer 646 is disposed on an outer surface 648 of the lower transparent substrate 606. A second polarizer 650 is disposed beneath the second birefringent layer 646. Typically, the first birefringent layer 640 and the second birefringent layer 646 are quarter wave plates or half-wave plates. Typically, the first polarizer 644 and the second polarizer 650 are crossed. Alternatively, one or both of the birefringent layers 640, 646 is not included.

In operation when no voltage is applied to the pixel electrode 516, the birefringent layers 640, 646 and the liquid crystal layer 611 transform the polarization of light propagating through the pixel 506 such that light passes through the first polarizer 644 and is reflected by the reflective electrode 632 is able to pass back through the first polarizer 644. Also, when no voltage is applied, the polarization of light from the backlight 230 is transformed by the birefringent layers 640, 646 and the liquid crystal layer 611 such that the light is able to pass through both polarizers 644, 650 in the transmissive left side of the exemplary pixel 506. However, applying a voltage to the pixel electrode 516 disturbs the helical arrangement of the liquid crystal layer 611, and affects the birefringent properties of the liquid crystal layer 611, such that the reflectance and transmittance of the exemplary pixel 506 will be diminished to a degree that depends on the magnitude of the voltage. The brightness of the pixel can thus be selected by selecting the voltage applied to the pixel electrode 516 from among the voltages output by the drive amplifiers 318. Such a display that presents a bright appearance when no voltage is applied is termed 'normally white'. Alternatively, a display that is normally dark is used in combination with other teachings described herein.

The reflectance of the display 102 is more important in high ambient light conditions. For example, outdoors on a sunny day, transmitted light from the backlight 230 might be insignificant compared to reflected light. On the other hand, under low light conditions in which the backlight 230 is used, the transmittance of the display 102 is more important.

Reflected light passes through the liquid crystal layer 611 twice whereas transmitted light passes through the liquid crystal layer 611 only once. In order to try to equalize the effect of disturbing the helical arrangement of the liquid crystal layer 611 on the modulation of brightness for transmitted and reflected light, the thickness of the liquid crystal layer 611 is made greater (e.g. twice as thick) above the transmissive electrode 633. Therefore, even though transmitted light passes through the liquid crystal layer 611 only once, the optical path length traversed by transmitted light in the liquid crystal layer 611 is closer to or equal to the optical path length traversed by reflected light. However, due to the complexity of the display 102, the equalization of the aforementioned effect is not perfect. Selecting an optoelectronic input/output compensation function based on the intensity of the ambient light and the backlight (if it is turned on) leads to improved display performance under a variety of lighting conditions. This explained in greater detail below.

Figure 7:
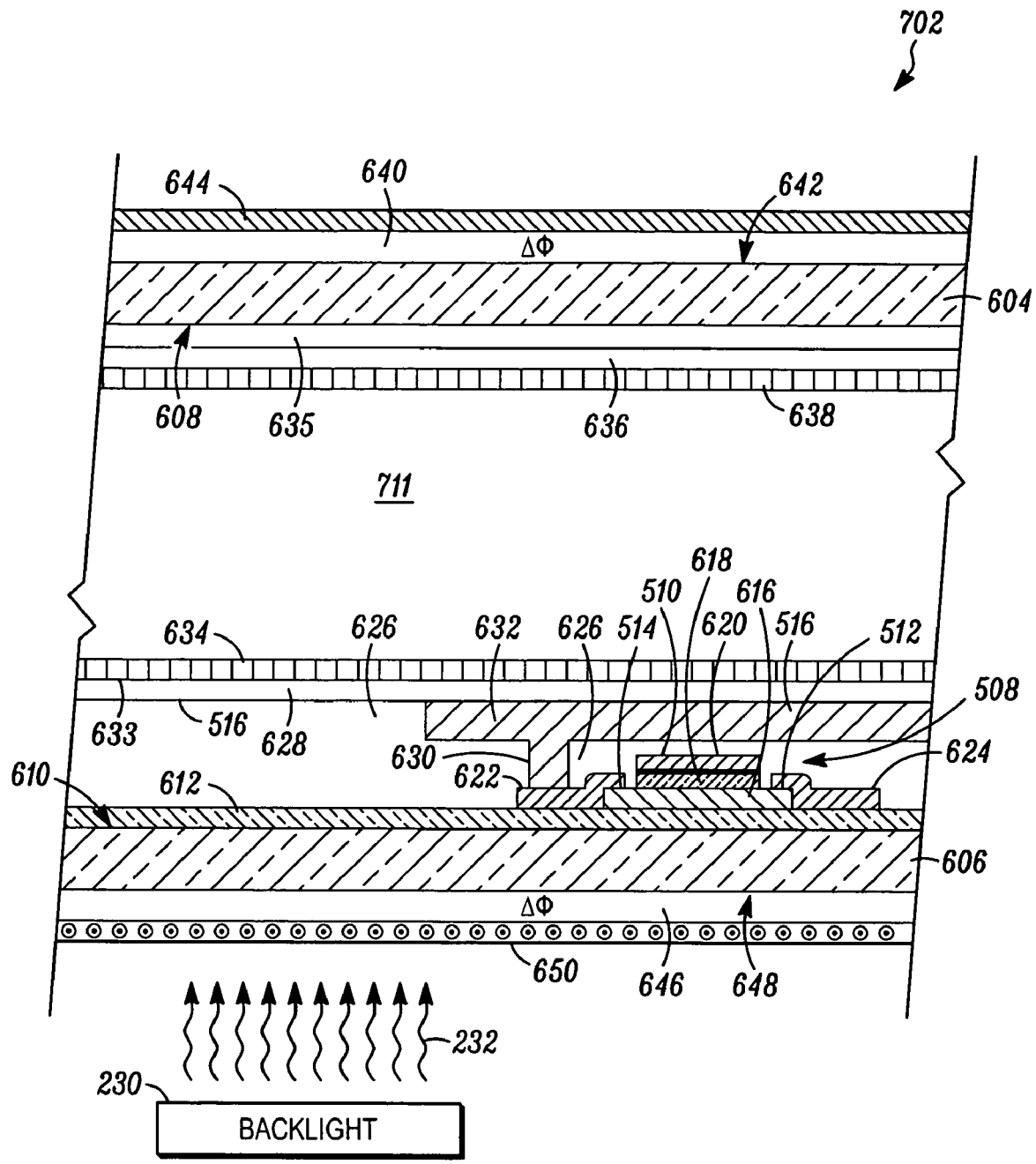
FIG. 7 is a partial sectional view of a pixel of the transflective display of the portable electronic device shown in FIG. 1 according to a second embodiment.

FIG. 7 is a partial sectional view of a pixel 702 of the display 102 of the portable electronic device shown in FIG. 1 according to a second embodiment. The pixel 702 shown in FIG. 7 differs from the pixel 506 shown in FIG. 6 in that the space available for a liquid crystal layer 711 in the pixel according to the second embodiment has a uniform or nearly the same thickness above the reflective electrode 632 and the transmissive electrode 633. Having a substantially uniform thickness simplifies the manufacturing of the display 102 but, as alluded to above, causes differences in the modulation of transmitted and reflected light due to the fact that transmitted light passes through the liquid crystal layer 711 once, whereas reflected light passes through the liquid crystal layer 711 twice.

For displays of the type shown in FIG. 7, the differences in modulation of reflected and transmitted light are more pronounced. However, by selecting an optoelectronic input/output compensation function that is well suited for reflective, transmissive or combined reflective and transmissive operation in particular lighting conditions, based on an ambient light reading and/or based on whether the backlight 230 is being operated, it is possible to, at least partially, compensate for differences in modulation of reflected and transmitted light, and thereby to improve the quality of images on the display 102.

Note that although two exemplary designs for the display 102 are shown in FIGS. 6-7, the particular design details of liquid crystal displays vary widely and the teaching described herein can be applied to a variety of other liquid crystal display designs as well.

Figure 8:
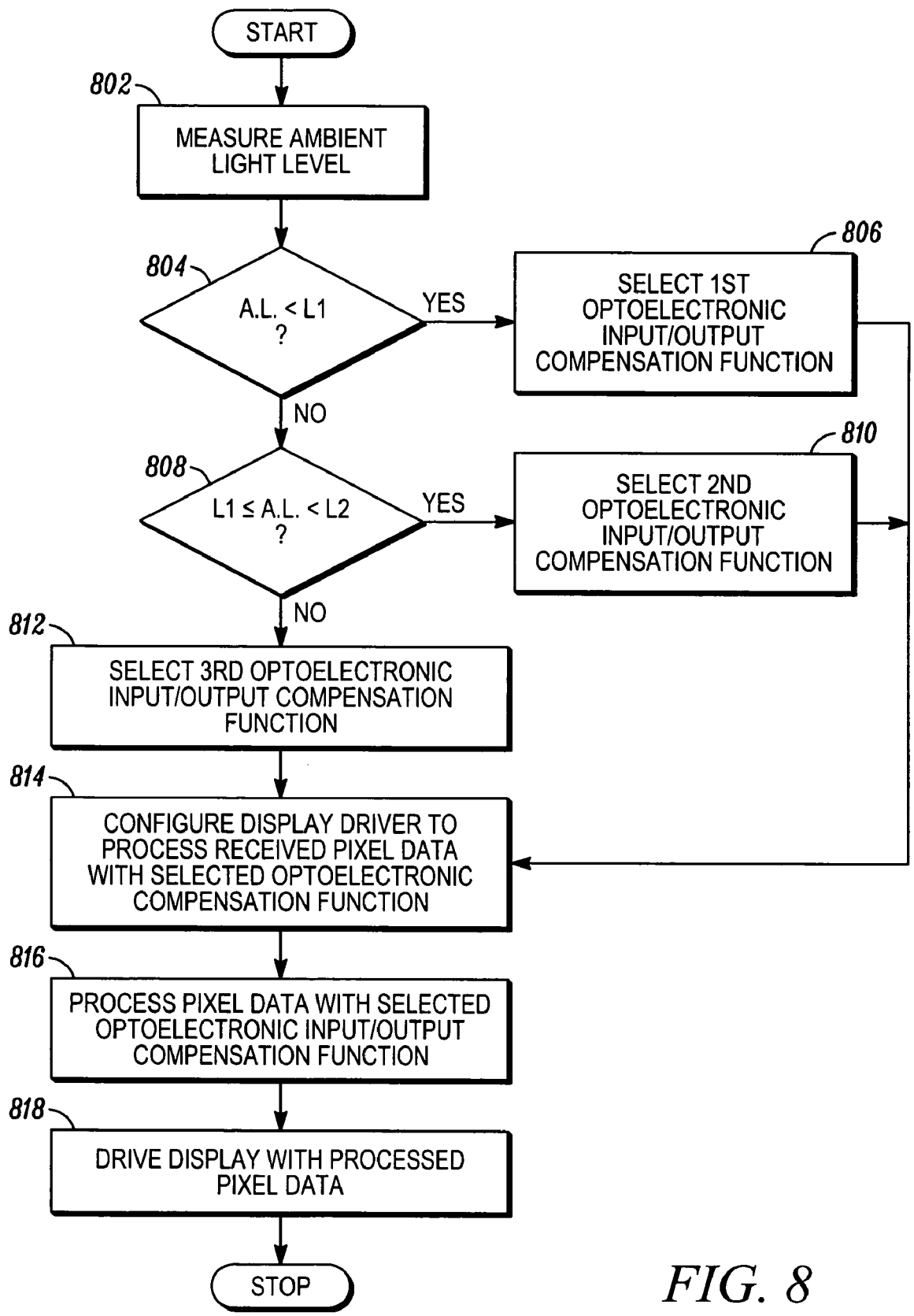
FIG. 8 is a flowchart of a first operating program of the portable electronic device shown in FIG. 1 according to the first or second embodiment.

FIG. 8 is a flowchart of a first operating program 800 of the portable electronic device 100 shown in FIG. 1 according to the first or second embodiment. The first operating program 800 is suitably stored in the program memory 222 and executed by the processor 204. In block 802, an ambient light level is measured. The ambient light level can be measured using the light sensor 110 or the camera 112.

In block 804 the ambient light level is compared to a first predetermined value L1. If it is determined in block 804 that the ambient light level is below the first predetermined value L1, then in block 806 a first optoelectronic input/output compensation function that has been chosen for low ambient light conditions is selected. If on the other hand, it is determined in block 804 that the ambient light level is not below the first predetermined value L1, then the program 800 continues with decision block 808, the outcome of which depends on whether the ambient light level is between the first predetermined value L1 and a second predetermined value L2. If so, then in block 810, a second optoelectronic input/output compensation function that has been chosen for intermediate ambient light levels is selected. If on the other hand, it is determined in block 808 that the ambient light level is not between the first and second predetermined values, then in block 812 a third optoelectronic input/output compensation function that has been chosen for high ambient light levels is selected. After one of the first, second and third optoelectronic input/output compensation functions is selected, the program 800 continues with block 814 in which a display driver (e.g., 216, FIG. 2) is configured to process pixel data with the selected optoelectronic input/output compensation function. In order to configure the display driver 216 to use the selected optoelectronic input/output compensation function, one or more commands with operands specifying the optoelectronic input/output compensation function (i.e. by specifying the configuration of the digitally controlled voltage divider 312 and the demultiplexers 314) are sent through the system bus 224 to the instruction/operand interface 302 (FIG. 3). In block 816, pixel data is processed with the selected optoelectronic input/output compensation function. The pixel data that is processed can, for example, include Graphical User Interface (GUI) elements, still images and/or videos. In block 818, the pixel data processed in block 816 is used to drive the display 102 in order to display information on the display 102.

Although the program shown in FIG. 8 selects one of three optoelectronic input/output compensation functions, alternatively one of two or one of four or more optoelectronic input/output compensation functions is chosen based on which of a like number of ambient light ranges the measured ambient light level falls into.

In the aforementioned alternative case that a display driver provides multiple optoelectronic input/output compensation functions for multiple color channels, further alternative refinements include using a light sensor that includes multiple filtered elements that have different spectral responses that correspond, at least roughly, to the color channels of the display driver and a display driven by the display driver or using the output of an included color camera to derive measures of ambient light weighted by multiple spectral responses (e.g., red, blue, and green). In such alternative refinements, an optoelectronic input/output compensation function for each of the multiple color channels of the display driver would be selected based on the spectral response weighted measurements of ambient light. By doing so the adverse effect on perceived display quality caused by variations in the color of ambient light, which may be experienced when a display of a portable device is moved into areas lit by suboptimal light, can be mitigated.

Figure 9:
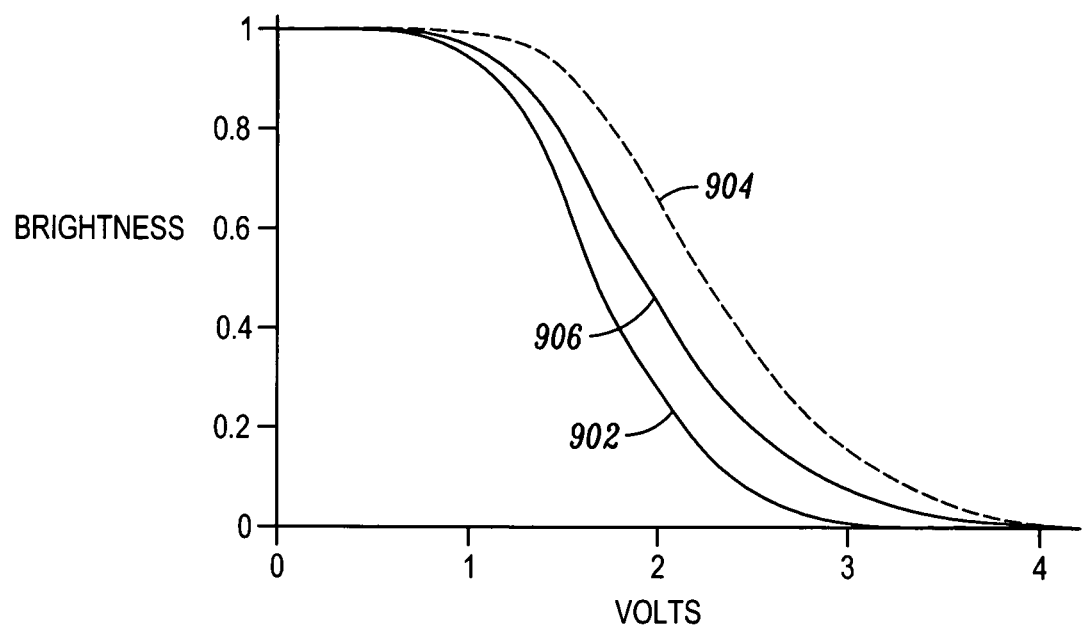
FIG. 9 is a graph including three plots of effective optoelectronic input/output functions for a transflective display with a substantially uniform liquid crystal layer thickness.

FIG. 9 is a graph 900 including three plots 902, 904, 906 of effective optoelectronic input/output functions for a transflective display with a substantially uniform liquid crystal layer thickness such as in FIG. 7. The abscissa of the graph 900 gives a voltage applied to pixel electrodes 516 of the transflective display 102 and the ordinate of the graph 900 gives a resulting brightness (in relative units normalized to yield a maximum value of one). The optoelectronic input/output function that characterizes a display is known in the art as a BV function. Plot 902 illustrates the effective BV function for pure transmissive mode, i.e., when the backlight 230 is turned on and the ambient light level is zero. Plot 904 illustrates the effective BV function for pure reflective mode, i.e., when the ambient light level is non-zero and the backlight 230 is turned off. Although displays having a substantially uniform thickness of the liquid crystal layer 711 such as shown in FIG. 7 are less expensive, for such displays the difference between the effective BV function for pure transmissive mode 902 and the effective BV function for pure reflective mode 904 is more pronounced as shown in FIG. 9. In general, for finite ambient light levels and finite backlight levels, the effective BV of a transflective display is approximated by:

$$BV\text{eff} = (Ibl*T\max*BV\_T + Ia*R\max*BV\_R)/(Ibl*T\max + Ia*R\max) \quad \text{EQU. 1}$$

Where,
  Ibl is the backlight brightness;
  Tmax is the maximum transmittance of the display;
  Ia is the ambient light brightness;
  Rmax is the maximum reflectance of the display;
  BV_T is the measured effective BV for pure transmissive mode (902); and
  BV_R is the measured effective BV for pure reflective mode (904).

Plot 906 is an effective BV function for an intermediate ambient light level at which reflection of ambient light and transmission of light from the backlight 230 contribute equally to the brightness of the transflective display 102.

The first predetermined light level L1 used in the first operating program 800 is suitably chosen to be between one-fourth and one-half of (Tmax/Rmax)*Ibl, the maximum transmitted backlight intensity divided by the maximum reflectivity. The second predetermined light level L2 is suitably chosen to be between two times and four times (Tmax/Rmax)*Ibl, the maximum transmitted backlight intensity divided by the maximum reflectivity.

The effective BV function for pure reflective mode 904 is suitably assumed for light levels above L2. On the other hand, the effective BV function for pure transmission mode 902 is suitably assumed for ambient light levels below L1.

In general, including in the above-mentioned alternative case in which an optoelectronic input/output compensation function is chosen based on which of four or more ranges the ambient light level falls into, an effective BV can be computed for each particular closed range (e.g., L1≦ambient light<L2) using an ambient light level that is the average of the bounds of the particular closed range in equation 1, for the upper open range (e.g., ambient light≧L2) the effective BV for pure reflective mode 904 is suitably used, and for the lower open range (e.g., ambient light<L1) the effective BV for pure transmissive mode 902 is suitably used. As described further below, an optoelectronic input/output compensation function is suitably determined in view of the effective BV for each range.

For dual thickness liquid crystal displays such as shown in FIG. 6, which are designed to have the effective BV for pure transmissive mode closely match the effective BV for pure reflective mode, it is unnecessary to take into account changes in the effective BV as the brightness of reflected light changes relative to the brightness of transmitted light. However, such displays are generally more expensive to manufacture.

Figure 10:
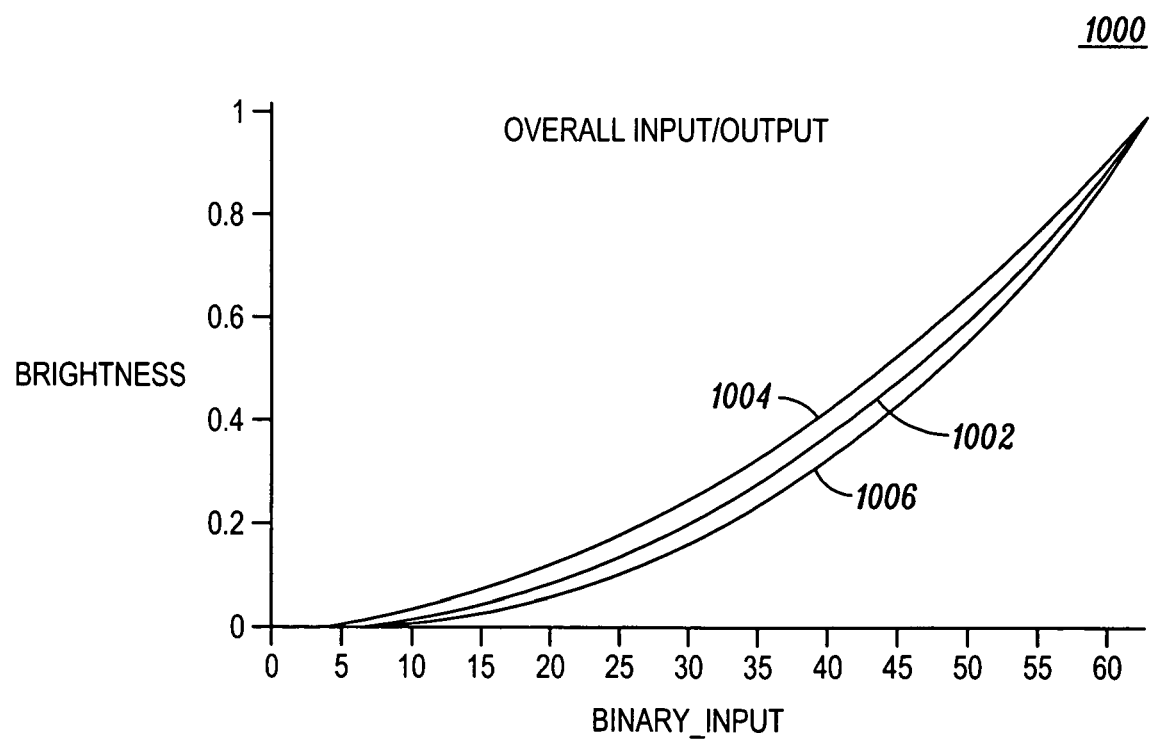
FIG. 10 is a graph including three overall optoelectronic input/output functions that are used for different ambient light levels.

FIG. 10 is a graph 1000 including three overall optoelectronic input/output functions 1002, 1004, 1006 that are used for different ambient light levels. The abscissa of the graph 1000 indicates binary pixel brightness values from zero to 63 (which is appropriate for 6-bit pixel data), and the ordinate is marked off in units of relative brightness (normalized to a maximum value of one). Each overall optoelectronic input/output function 1002, 1004, 1006 is a composite function in which the inner function is the optoelectronic input/output compensation function which gives voltage output of the display driver 216 as a function of discrete (binary) pixel brightness values input to the display driver 216 and the outer function is an effective BV for the transflective display 102, e.g. 902, 904, 906. A first overall optoelectronic input/output function 1002 is given by:
EQU. 2:

$$\text{Brightness} = \left(\frac{BPBV}{63}\right)^{2.2}$$

where, BPBV is a binary pixel brightness value; and
63 is the maximum level for the example of 6 bit data.

The overall optoelectronic input/output function given by equation 2 (also known as a gamma function) is a legacy of cathode ray tube (CRT) technology. It corresponds to the effective BV of cathode ray tubes. Owing to the strong legacy of CRT technology, much of the image and video content that is currently available has been preprocessed with the inverse function of EQU. 2 so that linearity will be recovered when the content is displayed on a CRT. Therefore, in order to display such content correctly on a transflective display, an overall optoelectronic input/output function that substantially equals EQU. 2 should be implemented.

A second overall optoelectronic input/output function 1004 is given by EQU. 2 with the exponent 2.2 replaced by a lower value, suitably a value in the range of 1.0 to 2.19. (The plot of the second overall optoelectronic input/output function 1004 is based on an exponent of 1.9.) Using a lower value of the exponent increases the overall brightness of the transflective display 102 and generally improves its performance at high ambient light levels including ambient light levels that are sufficiently high to render the light produced by the backlight 230 negligible, at which point the backlight 230 may be turned off to conserve power. Using a lower exponent in high ambient light conditions increases the brightness of low brightness areas of an image such that the image will be more fully visible in the presence of background image noise due to unmodulated reflections (glare) from the front surface and layer interfaces of the display 102.

A third optoelectronic input/output function 1006 is given by EQU. 2 with the exponent 2.2 replaced by a higher value, suitably in the range of 2.21 to 2.9. (The plot of the third optoelectronic input/output function 1006 is based on an exponent of 2.5.) At low ambient light levels, there is less background image noise from glare. Additionally, at low ambient light levels, an observer's pupil will be dilated and an observer will be able to perceive greater detail in generally low brightness regions of a displayed image when using a higher valued exponent. Alternatively, the exponent is kept at 2.2 for low ambient light levels.

According to alternative embodiments, rather than generating overall optoelectronic input/output functions that are given by a simple power law as in the cases shown in FIG. 10, other functions such as polynomials or empirically-determined piecewise-defined functions are used. Overall optoelectronic input/output functions that yield good performance when used with a particular display under particular ambient light conditions can be determined by routine testing of different variations from what is shown in FIG. 10, with one or more human observers.

Figure 11:
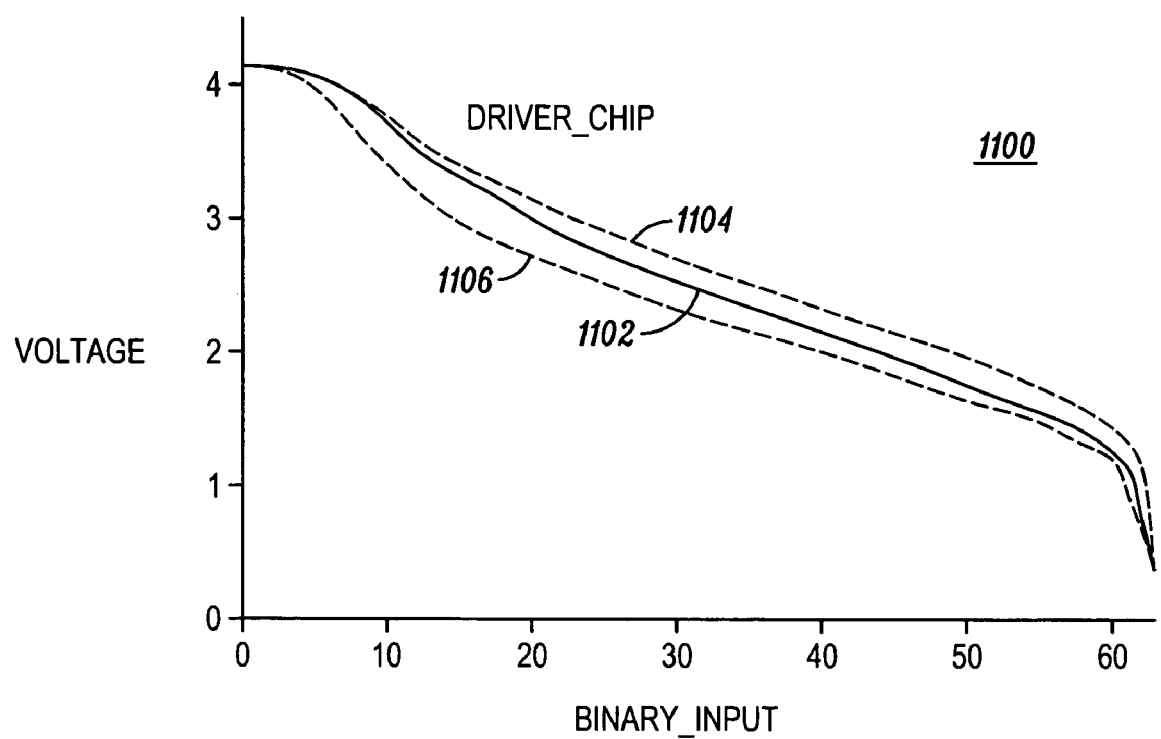
FIG. 11 is a graph including three optoelectronic input/output compensation functions that can be used in the first operating program shown in FIG. 8 for the three different light conditions addressed in FIG. 9 in order to obtain the three overall optoelectronic input/output functions shown in FIG. 10.

FIG. 11 is a graph 1100 including three optoelectronic input/output compensation functions 1102, 1104, 1106 that can be used in the first operating program shown in FIG. 8 for the three different light conditions addressed in FIG. 9 in order to obtain the three overall optoelectronic input/output functions shown in FIG. 10. The abscissa of graph 1100 indicates binary pixel brightness values input to the display driver 216 and the ordinate corresponds to voltage output by the display driver 216. A first optoelectronic input/output compensation function 1102 yields the first overall optoelectronic input/output compensation function 1002 when used at an ambient light brightness and backlight brightness at which the effective BV is given by curve 906. In practice, the first optoelectronic input/output compensation function is suitably chosen for ambient light levels in the range between L1 and L2.

A second optoelectronic input/output compensation function 1104 yields the second overall optoelectronic input/output compensation function 1004 when used at an ambient light levels that are sufficiently high that, per equation 1, the effective BV is well approximated by the effective BV for pure reflective mode 904. In practice, the second optoelectronic input/output compensation function 1104 is suitably chosen for light levels that exceed the second predetermined light level L2.

A third optoelectronic input/output compensation function 1106 yields the third overall optoelectronic input/output compensation function 1006 when used at an ambient light levels that are negligible compared to the backlight intensity such that, per equation 1, the effective BV is well approximated by the effective BV for pure transmissive mode 902. In practice, the third optoelectronic input/output compensation function 1106 is suitably chosen for light levels below the first predetermined light level L1.

An optoelectronic input/output compensation function that yields a particular desired overall optoelectronic input/output function when used under light conditions that yield a particular effective BV can be calculated using the following equation:

$$\text{O.I.O.C.F} = \text{Inverse\_BV}(\text{O.O.I.O.F}) \qquad \text{EQU 3}$$

Where,
O.I.O.C.F is an optoelectronic input/output compensation function;
Inverse_BV is an inverse function of the particular effective BV; and
O.O.I.O.F is a desired overall optoelectronic input/output function.

In practice, a discrete quantized approximation of the optoelectronic input/output compensations functions 1102, 1104, 1106 shown in FIG. 11 are implemented in the display driver 216 as discussed above in reference to FIGS. 3, 4. In certain instances, a more accurate approximation may be realized by providing a digitally controlled voltage divider 312 with more variable resistors and taps and providing more demultiplexers 314. However, a point of diminishing returns will be reached beyond which improvements in the accuracy of the approximation do not lead to perceptible improvements.

According to another alternative embodiment, rather than varying the overall optoelectronic input/output function as a function of the ambient light level, it is fixed. In this case, varying the optoelectronic input/output compensation function as a function of ambient light level serves to compensate for changes in the effective BV in order to maintain a predetermined overall optoelectronic input/output function, for example that given by equation 2.

Figure 12:
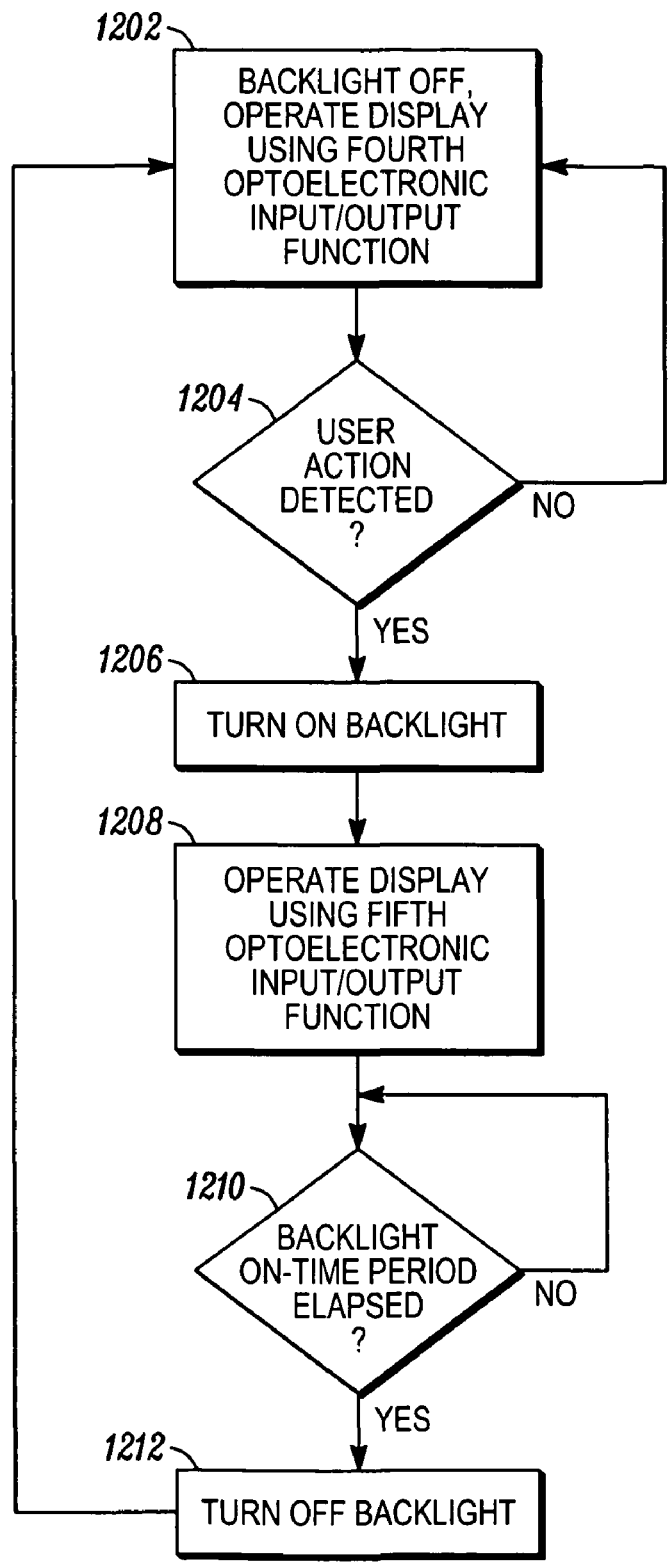
FIG. 12 is a flowchart of a second operating program for the portable electronic device shown in FIG. 1 according to a third embodiment.

FIG. 12 is a flowchart of a second operating program 1200 for the portable electronic device 100 shown in FIG. 1 according to a third embodiment. The second operating program 1200 is suitably stored in the program memory 222 and executed by the processor 204. As shown in block 1202, the second program 1200 commences in a default state with the backlight 230 off and a fourth optoelectronic input/output compensation function being used in driving the display 102. Block 1204 is a decision block, the outcome of which depends on whether user action is detected. User action can comprise some form of user input such as pressing a key of the keypad 108, or in an alternative clamshell type device opening the device, or in an alternative case of a voice-controlled device speaking a command. If no user action is detected in block 1204, the program 1200 continues operating as indicated in block 1202. If, on the other hand, user action is detected in block 1204, then in block 1206 the backlight 230 is turned on, and in block 1208 the optoelectronic input/output compensation function that is used to drive the display 102 is changed to a fifth optoelectronic input/output compensation function that yields improved display appearance when using the backlight 230. In order to operate the display 102 with the fifth optoelectronic input/output compensation function, the display driver 216 is reconfigured so that voltages that are applied to the pixel electrodes 516 (reflective electrodes 632 and transmissive electrodes 633) based on input binary pixel data are determined using the fifth optoelectronic input/output compensation function. Following block 1208, decision block 1210 determines if a preprogrammed backlight on-time period has elapsed. The on-time period can be counted from the commencement of user action detected in block 1204 or from the last instance of user action. Different on-times can be triggered by different types of user action, or a single on-time can be used. When the on-time period has elapsed, the program 1200 continues with block 1212 in which the backlight 230 is turned off, and thereafter loops back to the default state represented in block 1202.

Using the program 1200 shown in FIG. 12 allows two optoelectronic input/output compensation functions, one of which is optimized for the backlight off condition and one of which is optimized for the backlight on condition, to be used, thereby avoiding the necessity to sacrifice display performance by using an optoelectronic input/output compensation function that is a compromise between the demands of the backlight on condition and the backlight off condition.

Figure 13:
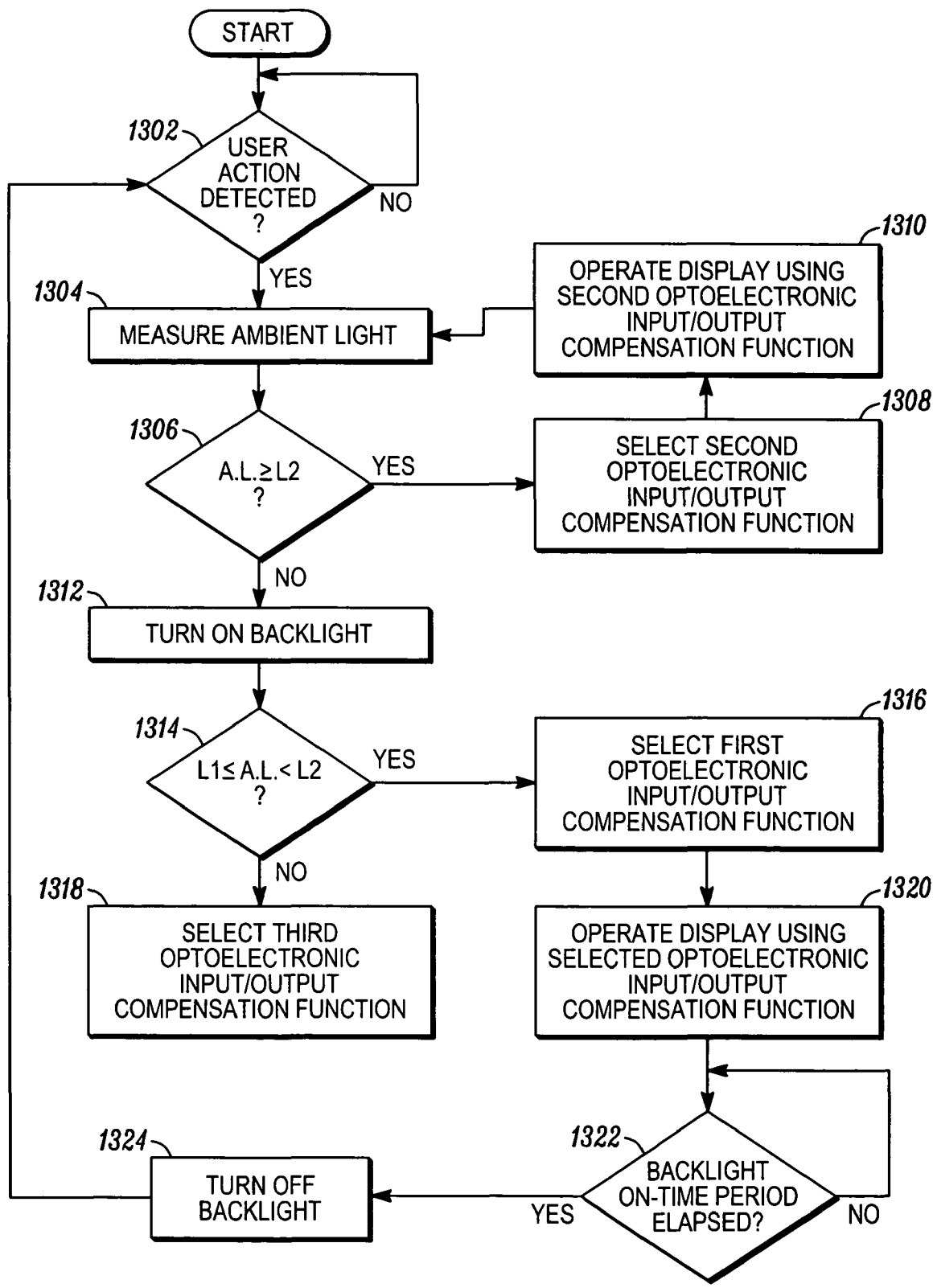
FIG. 13 is a flow chart of a third operating program for the portable electronic device shown in FIG. 1 according to a fourth embodiment.

FIG. 13 is a flow chart of a third operating program 1300 for the portable electronic device 100 shown in FIG. 1 according to a fourth embodiment. The program 1300 starts in a default state with the backlight 230 off. As indicated in block 1302 when user action is detected, the program 1300 proceeds to block 1304 in which the light sensor 120 or camera 122 is used to measure the ambient light level. Thereafter in block 1306 the measured ambient light level is compared to the second predetermined light level L2. If it is determined in block 1306 that the ambient light level exceeds the second predetermined light level L2, then in block 1308 the second optoelectronic input/output compensation function 1104 is selected, and in block 1310 the second optoelectronic input/output compensation function 1104 is used to operate the display 102. While the display 102 is being operated according to the second optoelectronic input/output function, the program 1300 periodically returns to block 1304 to check if the ambient light level has changed.

If in block 1306 it is determined that the ambient light level is below the second predetermined light level, then the program 1300 continues with block 1312 in which the backlight 230 is turned on. Thereafter in block 1314 it is determined if the measured ambient light level is between the first predetermined light level L1 and the second predetermined light level L2. If so, then in block 1316 the first optoelectronic input/output compensation function 1102 is selected. If not then in block 1318 the third optoelectronic input/output compensation function 1106 is selected. After blocks 1316 or 1318, the program 1300 proceeds to block 1320 in which the display 102 is operated using the selected optoelectronic input/output function. In block 1322 a determination is made as to whether a backlight on-time period has elapsed. If so, then the backlight 230 is turned off in block 1324 and the program returns to block 1302.

For high ambient light levels the backlight 230 will typically make only a small contribution to the brightness of the display 102, so turning off the backlight reduces battery consumption without significantly affecting display quality. The ability to rely on reflected light in high ambient light conditions is a feature of transflective displays.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. An electronic device comprising: a display; a light sensor for measuring an ambient light level and outputting a light level signal; and an electronic circuit coupled to said display and said light sensor, wherein said electronic circuit is adapted to receive said light level signal and to select an optoelectronic input/output compensation function from a set of optoelectronic input/output compensation functions that is used in driving said display based, at least in part, on said light level signal, and drive said display using said optoelectronic input/output compensation function, wherein each optoelectronic input/output compensation function of the set of optoelectronic input/output compensation function is predefined for a range of ambient light levels wherein:

said display comprises a transflective liquid crystal display comprising a plurality of pixels wherein each of said plurality of pixels comprises a pixel electrode comprising a reflective part and a transmissive part that is in electrical contact with said reflective part;

said electronic device further comprises a backlight optically coupled to said transflective liquid crystal display; and said electronic circuit comprises:

a backlight driver coupled to said backlight; and a display driver that includes a plurality of drive signal sources that are selectively coupled to said pixel electrode in accordance with pixel brightness data, and wherein voltage levels of said plurality of drive signal sources are chosen to implement the optoelectronic input/output compensation function; wherein:

said transflective liquid crystal liquid crystal display exhibits a first BV function for transmitted light and a second BV function for reflected light wherein said first BV function is substantially different from said second BV function; and wherein, said electronic circuit is adapted to determine which of a plurality of ranges includes said ambient light level, and to select said optoelectronic input/output compensation function from the set of optoelectronic input/output compensation functions based on which said plurality of ranges includes said ambient light level;

wherein said plurality of ranges comprises:

at least one closed range having an upper bound and a lower bound, and wherein, at ambient light levels in said at least one closed range, both reflected light and transmitted light make substantial contributions to illuminating said transflective liquid crystal display, and wherein the optoelectronic input/output compensation function selected when said ambient light level falls within said at least one closed range is a composite function of an inner function that is substantially a power law overall input/output function and an outer function that is an inverse of an effective BV function that is a weighted average of said first BV function and said second BV function wherein a first weight on said first BV function quantifies a first contribution of transmitted light to illuminating said display and a second weight on said second BV function quantifies a second contribution of reflected light to illuminating said display at a predetermined light level in said at least one closed range.

2. The electronic device according to claim 1 wherein:
said display comprises a transflective liquid crystal display; and
said electronic device further comprises:
    a backlight optically coupled to said transflective liquid crystal display and electrically coupled to said electronic circuit.

3. The electronic device according to claim 2 wherein said electronic circuit is further adapted to selectively power said backlight and to select said optoelectronic input/output compensation function from the set of optoelectronic input/output compensation functions also based on whether said backlight is being powered.

4. The electronic device according to claim 3 wherein:
said electronic circuit is adapted to selectively power said backlight based, at least in part, on said light level signal.

5. The electronic device according to claim 4 wherein:
said light sensor comprises a camera integrated into said electronic device.

6. The electronic device according to claim 5 comprising a wireless communication device.

7. The electronic device according to claim 1 wherein:
said transflective liquid crystal display comprises a first transparent substrate, a second transparent substrate, a liquid crystal material disposed between said first transparent substrate and said second transparent substrate, wherein a space available for said liquid crystal material between said first transparent substrate and said second transparent substrate has a substantially uniform thickness proximate said reflective part and said transmissive part of said pixel electrode.

8. An electronic device comprising: a transflective display; a display driver coupled to said transflective display; a backlight optically coupled to said transflective display; a backlight driver coupled to said backlight; an ambient light sensor;
    a processor coupled to said display driver and to said ambient light sensor, wherein said processor is programmed to:
    read said ambient light sensor to obtain a measure of an ambient light level; and based on said measure of said ambient light level, select an optoelectronic input/output compensation function from a set of optoelectronic input/output compensation functions and configure said display driver to effect said optoelectronic input/output compensation function, wherein each optoelectronic input/output compensation function of the set of optoelectronic input/output compensation functions is predefined for a range of ambient light levels;
    wherein: said transflective display exhibits a first BV function for transmitted light and a second BV function for reflected light wherein said first BV function is substantially different from said second BV function;
    wherein: said optoelectronic input/output compensation function is selected to yield an overall optoelectronic input/output function that substantially equals a power law function;
    wherein: for intermediate ambient light levels at which light from said backlight and ambient light reflected by said transflective display both make substantial contributions to a brightness of said transflective display, said processor is programmed to select an optoelectronic input/output compensation function that is a composite function of an inner function which is said overall optoelectronic input/output function and an outer function which is an inverse of an effective BV function that is a weighted average of said first BV function and said second BV function wherein a first weight on said first BV function quantifies a first contribution of transmitted light to illuminating said display and a second weight on said second BV function quantifies a second contribution of reflected light to illuminating said display.

9. The electronic device according to claim 8 wherein said power law function has an exponent of 2.2.

* * * * *